(12) United States Patent
Zhu et al.

(10) Patent No.: US 9,116,259 B2
(45) Date of Patent: Aug. 25, 2015

(54) THREE DIMENSIONAL ANGULAR ADJUSTABLE OPTICAL MOUNT

(75) Inventors: Jianqiang Zhu, Shanghai (CN); Fang Liu, Shanghai (CN); Hongbiao Huang, Shanghai (CN); Gengxiu Tang, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 270 days.

(21) Appl. No.: 13/806,766

(22) PCT Filed: Jun. 28, 2011

(86) PCT No.: PCT/CN2011/001064
§ 371 (c)(1),
(2), (4) Date: Mar. 19, 2013

(87) PCT Pub. No.: WO2012/171145
PCT Pub. Date: Dec. 20, 2012

(65) Prior Publication Data
US 2013/0194688 A1    Aug. 1, 2013

(30) Foreign Application Priority Data

Jun. 17, 2011    (CN) .......................... 2011 1 0163866

(51) Int. Cl.
G02B 5/00    (2006.01)
G02B 7/02    (2006.01)
G02B 7/00    (2006.01)

(52) U.S. Cl.
CPC . *G02B 7/00* (2013.01); *G02B 7/004* (2013.01)

(58) Field of Classification Search
None
See application file for complete search history.

(56) References Cited

U.S. PATENT DOCUMENTS

| 5,419,522 | A | | 5/1995 | Luecke et al. | |
|---|---|---|---|---|---|
| 5,530,547 | A | * | 6/1996 | Arnold | 356/458 |
| 5,694,257 | A | * | 12/1997 | Arnone et al. | 359/822 |
| 5,847,885 | A | * | 12/1998 | Arnone et al. | 359/818 |
| 5,877,902 | A | * | 3/1999 | Sauter | 359/809 |
| 2003/0043294 | A1 | | 3/2003 | Saitoh | |
| 2011/0102893 | A1 | * | 5/2011 | Solyar et al. | 359/503 |

FOREIGN PATENT DOCUMENTS

| CN | 2577407 Y | 10/2003 |
|---|---|---|
| CN | 101144895 A | 3/2008 |

* cited by examiner

*Primary Examiner* — Jade R Chwasz
(74) *Attorney, Agent, or Firm* — Manni Li; Mei & Mark LLP

(57) ABSTRACT

A compact optical mount for adjust optical component in 3 dimensions. Based on the traditional 2D adjustable optical mount, its inner space is utilized for installing the third dimension angular adjustment. By virtue of its compact structure, convenient adjustment, high precision and good stability, the invention is suitable for adjusting small optics in 3 dimensions, by which the real optical axil can agree with the idea optical axil well to fast adjust the whole optical system.

20 Claims, 11 Drawing Sheets

THREE DIMENSIONAL ANGULAR ADJUSTABLE OPTICAL MOUNT

CROSS REFERENCE TO RELATED APPLICATIONS

This is the U.S. national stage entry of International Application No. PCT/CN2011/001064, filed on Jun. 28, 2011, which in turn claims priority to Chinese Patent Application No. 201110163866.0, filed Jun. 17, 2011, each of which is hereby incorporated by reference herein in its entirety.

FIELD OF INVENTION

The present invention relates generally to precision optical mounts that carry and reliably position an optical element, so that optical system can be arranged in a compact and optically efficient system, wherein space consumption is minimized without introducing distortion.

DESCRIPTION OF THE RELATED ART

In optical systems, angular adjustments are widely used. A Conventional apparatus is illustrated in FIGS. 1 and 2 known as "three-point suspension", which is good for 2D adjusting. Such conventional apparatuses include a base plate 67 and a stage plate 68, where the two plates are restrained by a plurality of springs 66 (one of them is illustrated). Three adjusting screws 64, 65, 71 are threadably received through the base plate 67 and engage the rear surface of the stage plate 68. In this way, the desired "three-point suspension" mechanism is provided. To avoid the attrition between the adjusting screw 71 and the stage plate 68, a flat pad made by hard material is usually used to contact with the adjusting screw 71. For simplicity reason, the surface to receive adjusting screw 65 is always a conical surface, two pins are cooperated with one another to create a V-shaped groove to receive adjusting screw 64. An aperture 70 and 69 are provided in base plate 67 and stage plate 68 respectively so that an unobstructed optical path is formed through the mount.

Commonly, 2D adjustable optical mounts can maintain most of the optical adjustment. However, in some optical systems, taking polaroids as an example, need to be adjusted along the axis. Hence, 3D adjustable optical mount is required. To realize such a function, a rotational angular adjustable mount combined with a "three-point suspension" 2D angular adjustable optical mount is traditionally utilized. As a result, the combination decreases the stability and complicates the structure.

SUMMARY OF THE INVENTION

This plant utilizes the space between the two plates of the "three-point suspension" 2D angular adjustable mount, a rotational angular adjustment is installed among the space to reduce the size of the whole adjusting system and simplify the structure. According to the embodiment of the invention, a precision optical mount is disclosed having a rectangular back plate that is coupled in spaced, facing alignment to a rectangular front plate by means of a pair of plate restraining springs. A set of interchangeable modular actuators extend through the back plate to engage the front plate so that the front plate can be moved relative to the back plate to import a tilting or translational movement steadily. A room is milled in the rear surface of the back plate to place a so-called flange, an interchangeable modular actuator extends through the side of the back plate to the flange with a rotational retaining spring to generate rotational adjustment. An inner-barrel with an optical element fixed axially in the inner side of the inner-barrel with clamping screw is axially installed into the mid-barrel for rough adjustment. A mid-barrel is connected to the flange by screws from the front plate by axially extending through a threaded hole in it for fine adjustment.

By virtue of the compact structure, optical element in the smaller sleeve can be adjusted in 3 dimensions simply, the mechanical axis and optical axis can be agreed very well, the stability is also improved.

DETAILED DESCRIPTION

Figure 4:
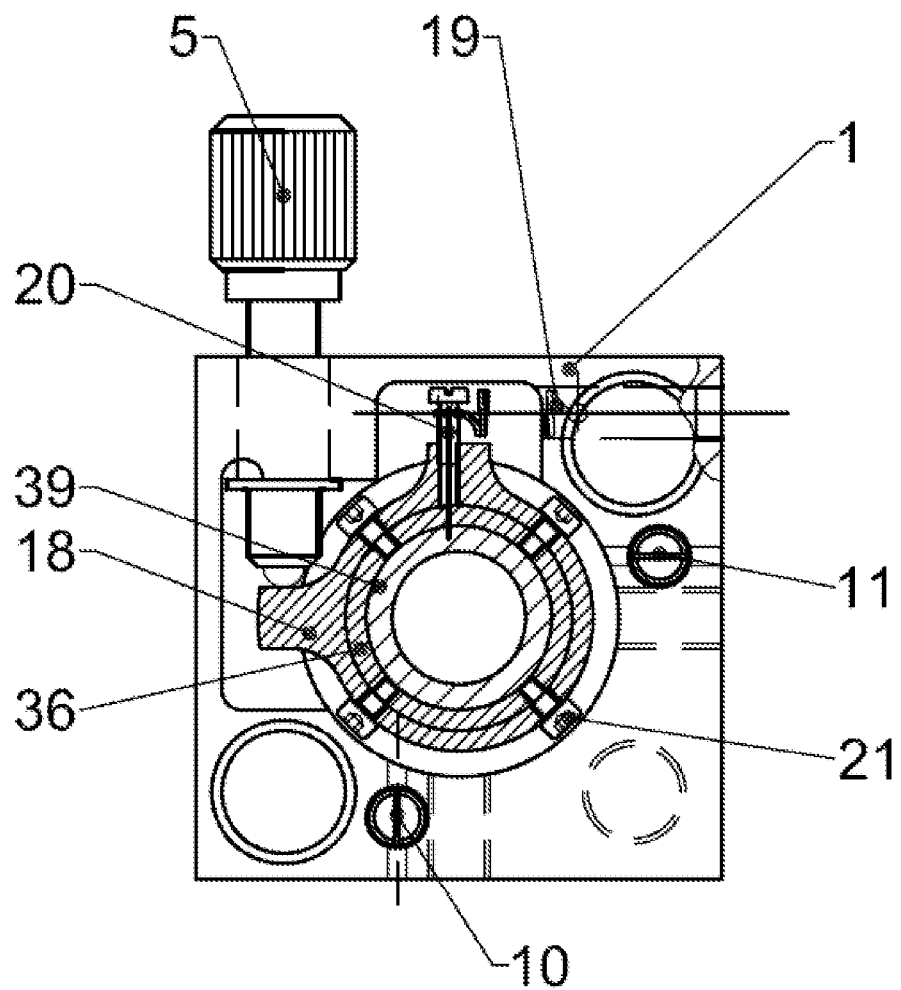
FIG. 4 illustrates a cross section of A-A' in FIG. 3.
Figure 5:
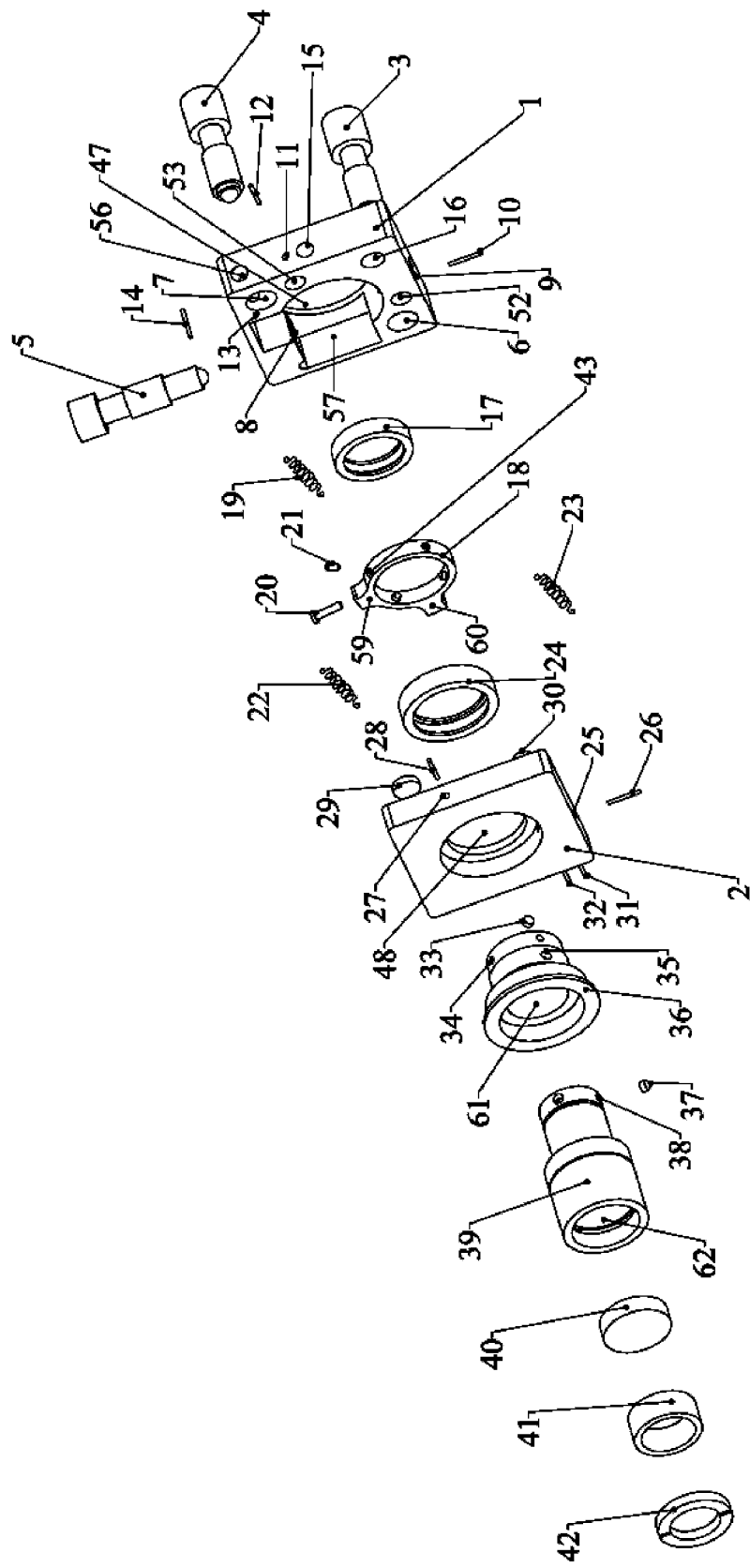
FIG. 5 illustrates an exploded view of an exemplary embodiment.
Figure 6:
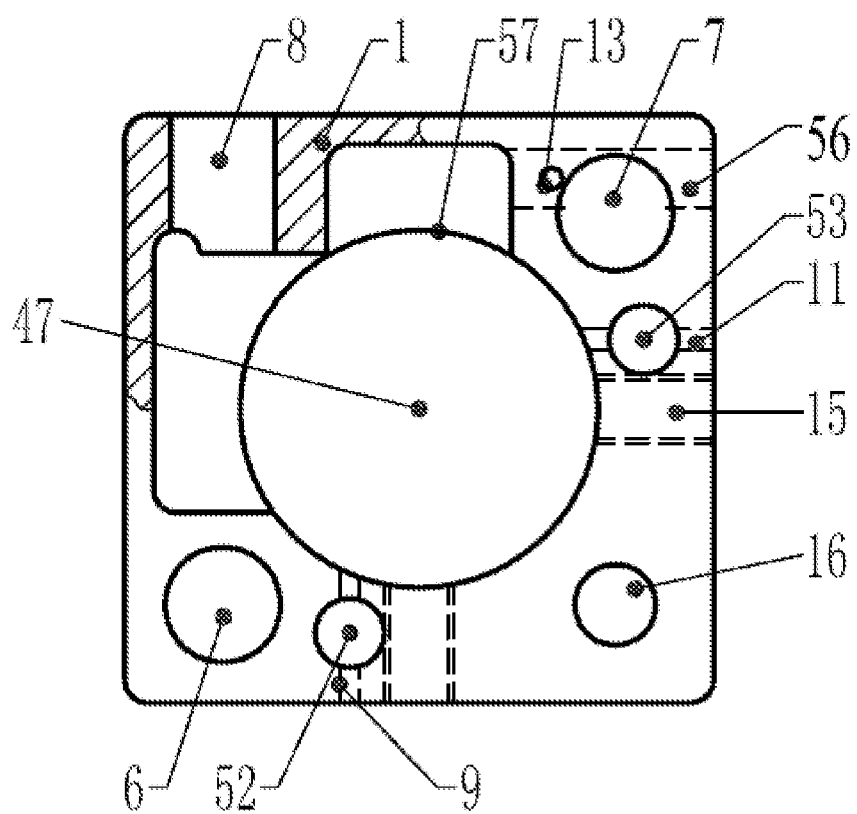
FIG. 6 illustrates a left view of the back plate of an exemplary embodiment.

FIG. 5 is the exploded view of the invention. The optical mount has a stationary rectangular back plate 1 and a moveable rectangular front plate 2 that are coupled in spaced facing alignment with one another. Referring to FIGS. 6 and 4, said back plate 1 has an aperture 47 that is larger than optical beam diameter. There is a space 57 in the head face of rectangular back plate 1 facing said rectangular front plate 2 around aperture 47 for installing the flange 18, clamping ring 24 and the third spring 19. A first actuator retaining hole 6 and a second actuator retaining hole 7 are formed in two of the opposite corners of the rectangular back plate 1, a first conical bore 16 is located in one of the other corners of the rectangular back plate 1. Near space 57, a third pin hole 13 is formed in the head face of rectangular back plate 1, a third through spring receiving pocket 56 is formed in the side face of the rectangular back plate 1. A third actuator retaining hole 8 is formed in the side face of the rectangular back plate 1 opposite the first conical bore 16. A first through spring receiving pocket 52 is formed between the first actuator retaining hole 6 and the first conical bore 16. A second through spring receiving pocket 53 is formed between the second actuator retaining hole 7 and the first conical bore 16. A vertical first pin hole 9 is located in the nether side of the rectangular back plate 1. A horizontal second pin hole 11 and a set of threaded mounting holes 15 are formed in the right side of the rectangular back plate 1. There are also a third pin hole 13 and a third through spring receiving pocket 56 near the second actuator retaining hole 7.

Figure 7:
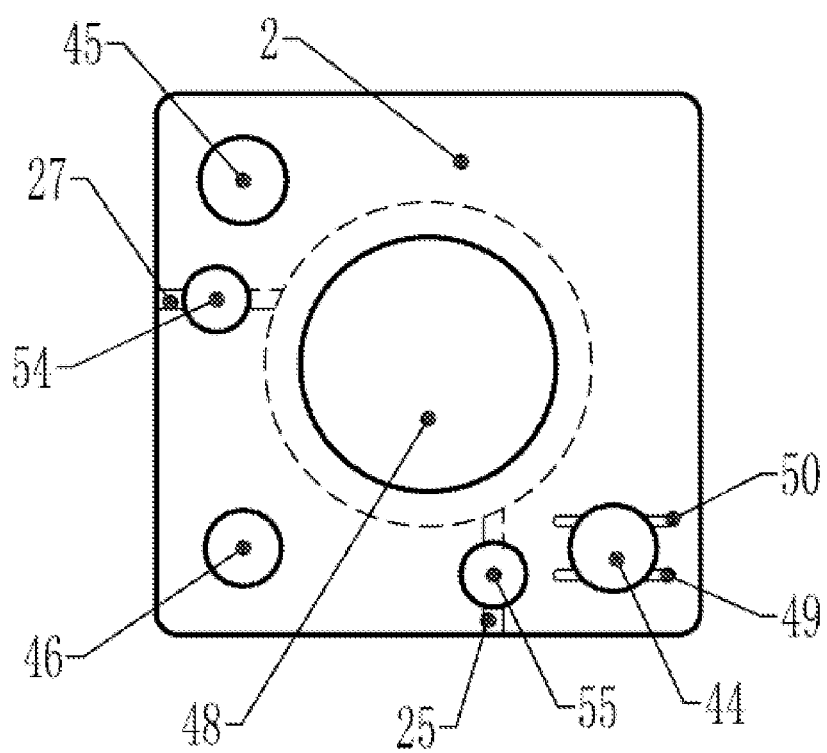
FIG. 7 illustrates a right view of the front plate of an exemplary embodiment.

In FIG. 7, a 2-level step-hole 48 is formed in the middle of the rectangular front plate 2. Corresponding to the second actuator retaining hole 7, the second through spring receiving pocket 53, the first conical bore 16, the first through spring receiving pocket 52 and the first actuator retaining hole 6 in rectangular back plate 1, accordingly, a second blind hole 45, a second blind spring receiving pocket 54, a second conical bore 46, a first blind spring receiving pocket 55 and a first blind hole 44 are formed in the rectangular front plate 2. In both side of the first blind hole 44 there are a first pin holder 49 and a second pin holder 50, respectively. There are also a fourth pin hole 25 and a fifth pin hole 27 in accordance with the first blind spring receiving pocket 55 and the second blind spring receiving pocket 54.

Figure 8:
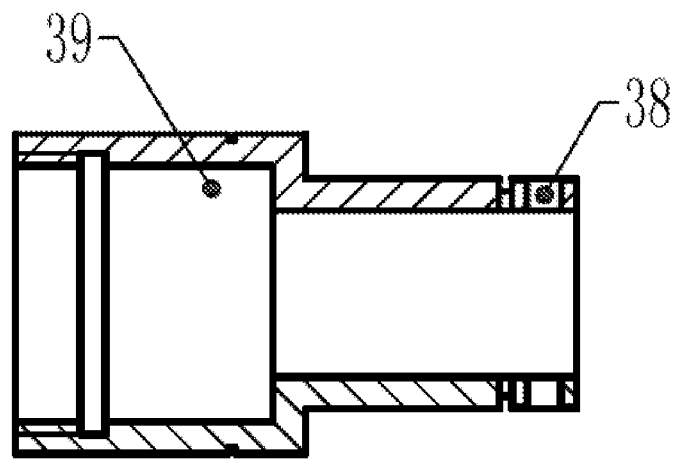
FIG. 8 illustrates a cross section of the inner-barrel of an exemplary embodiment.
Figure 9:
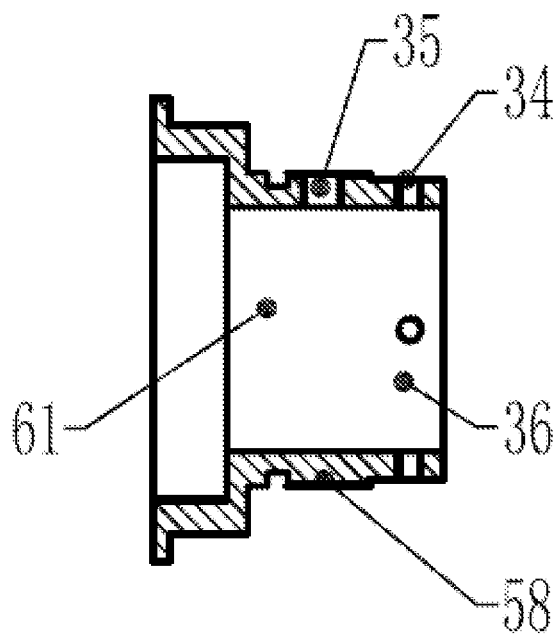
FIG. 9 illustrates a semi-section view of the mid-barrel of an exemplary embodiment.
Figure 10:
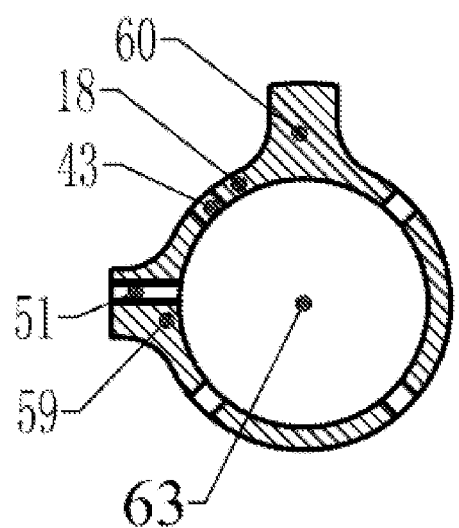
FIG. 10 illustrates a cross section of the flange of an exemplary embodiment.
Figure 11:
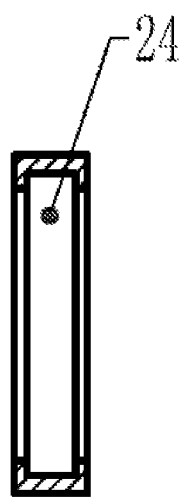
FIG. 11 illustrates a cross section of the clamping ring of an exemplary embodiment.
Figure 12:
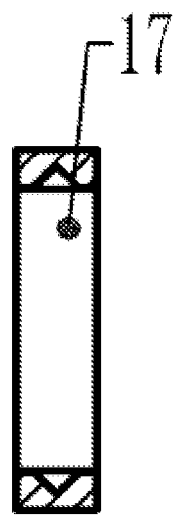
FIG. 12 illustrates a cross section of the retainer ring of an exemplary embodiment.

FIG. 8 shows an inner-barrel 39, which is a barrel that consists of 3-level steps in both inner and outer sides. The first level inner step is threaded; the third level inner step is larger than optical beam in diameter; the third level outer step which is threaded; several first threaded holes 38 are equally distributed in radial direction in the third outer step;

FIG. 9 shows a mid-barrel 36, which is a barrel that consists of 2-level steps in inner side and 4-level steps in outer side. A second threaded hole 35 is radially formed in the third level outer step which is threaded; several third threaded holes 34 are equally distributed in radial direction in the fourth level outer step which is threaded;

In FIG. 10, a flange 18, equal numbers of first through holes 43 corresponding to the numbers of the first threaded holes 38 are equally distributed in radial direction of the flange 18. A spring bulge 59 and a screw rod bulge 60 are formed among the first through holes 43, in the spring bulge 59, there is a fourth threaded hole 51 in radial direction;

In FIG. 11, a clamping ring 24 has rectangular trough in its inner side;

In FIG. 12, a retainer ring 17 has V-shaped trough in its inner side;

the cylindrical pad 29 is made of magnetic material;

the first actuator 3, the second actuator 4 and the third actuator 5 are standard screw-nut modules;

the first pin 10, second pin 12, third pin 14, fourth pin 31, fifth pin 32, sixth pin 26, seventh pin 28 are all cylindrical pins;

the clamping screw 42 is an outer side threaded ring, and its inner diameter is larger than the optical beam;

the inner diameter of the sleeve 41 is larger than the optical beam.

The relationships among each component are described as follows:

said space 57 is used for installing the flange 18, clamping ring 24 and the third spring 19;

the first level and second level inner steps of mid-barrel 36 coordinate with the first level and second level outer steps of inner-barrel 39;

the diameter of flange 18 is the same with the fourth level outer step of mid-barrel 36;

the inner whorl of clamping ring 24 corresponds with that of the third level outer step of mid-barrel 36;

the inner whorl of retainer ring 17 corresponds with that of the third level outer step of inner-barrel 39;

during the installation, the mid-barrel 36 is plugged into the step-hole 48, and then the clamping ring 24 is cooperated with the whorl of the third level outer step of mid-barrel 36, the second keepers 33 cooperate with the second threaded holes 35 and contact with the rectangular trough of clamping ring 24 to restrain the axial displacement between mid-barrel 36 and rectangular front plate 2;

the flange 18 is fixed with the mid-barrel 36 by cooperating 4 third keeper 21 through first through holes 43 with the 4 third threaded holes 34, respectively;

the inner-barrel 39 passes through mid-barrel 36, the third level outer step of inner-barrel 39 cooperates with retainer ring 17 which is further clamped by the first keepers 37 contacting with V-shaped trough of retainer ring 17 after fixed by the first threaded holes 38 to restrain the axial displacement between mid-barrel 36 and inner-barrel 39;

the third actuator 5 is restrained by the third actuator retaining hole 8, and connects with screw rod bulge 60;

the fourth pin 31 and fifth pin 32 are settled in first pin holder 49 and the second pin holder 50, respectively, the cylindrical pad 29 is settled in the second blind hole 45;

one end of the first restraining spring 23 is captured by the sixth pin 26 held by the fourth pin hole 25 through the first blind spring receiving pocket 55, while the other end of the first restraining spring 23 is captured by the first pin 10 held by the first pin hole 9 through the first through spring receiving pocket 52. Similarly, one end of the second restraining spring 22 is captured by the seventh pin 28 held by the fifth pin hole 27 through the second blind spring receiving pocket 54, whereas the other end of the second restraining spring 22 is captured by the second pin 12 held by the second pin hole 11 through the second through spring receiving pocket 53. One end of the third restraining spring 19 is captured by the third pin 14 held by the third pin hole 13 through the third through spring receiving pocket 56, whereas the other end of the third restraining spring 19 is retained by the fourth keeper 20 cooperates with the fourth threaded hole 51;

the first actuator 3 and the second actuator 4 are restrained by the first actuator retaining hole 6 and the second actuator retaining hole 7 in rectangular back plate 1, respectively; one end of the first actuator 3 is received by a V-shaped groove formed by the fourth pin 31 and fifth pin 32 settled in the first pin holder 49 and second pin holder 50 respectively; one end of the second actuator 4 is received by cylindrical pad 29 settled in the second blind hole 45;

the optical element 40 is retained in the second level inner step of inner-barrel 39 which is clamped by the clamping screw 42 after being held by sleeve 41.

The differences between the base plate of conventional "three-point suspension" and the rectangular back plate 1 are: in the rectangular back plate 1, there is a space 57 around aperture 47. A first conical bore 16 is located in one corner. A third actuator retaining hole 8 is formed in the side face opposite the first conical bore 16 to restrain the third actuator 5. A third pin hole 13 is formed in the head face. There is a third through spring receiving pocket 56 formed in the side face to restrain the third spring 19. A set of threaded mounting holes 15 is located in the side face for fastening and install the plant.

In FIGS. 5 and 7, the difference between the stage plate of conventional "three-point suspension" and the rectangular front plate 2 is that there is a 2-level step-hole 48 in the middle of the rectangular front plate 2 in accordance with aperture 47 in rectangular back plate 1.

In FIGS. 5 and 8, the inner-barrel 39 consists of 3-level steps in both inner and outer sides. The first level inner step is threaded, and the third level inner step is larger than the optical beam in diameter, three first threaded holes 38 are equally distributed in radial direction in the third level outer step which is threaded.

In FIGS. 5 and 9, the mid-barrel 36 consists of 2-level steps in inner side and 4-level steps in outer side. The two steps in inner side are the same with the first and second level steps of inner-barrel 39 in diameter. A second threaded hole 35 is radially formed in the third level outer step which is threaded; four third threaded holes 34 are equally distributed in radial direction in the fourth level outer step which is threaded.

In FIGS. 5 and 10, the inner diameter of the flange 18 is the same with that of the fourth level outer step of mid-barrel 36. Four first through holes 43 are equally distributed in radial direction in the flange 18. A spring bulge 59 and a screw rod bulge 60 are formed among the first through holes 43. There is a fourth threaded hole 51 in radial direction.

In FIGS. 5 and 11, the inner whorl of clamping ring 24 is the same as that of the third level outer step of mid-barrel 36. The clamping ring 24 also has rectangular trough in its inner side;

In FIGS. 5 and 12, the inner whorl of retainer ring 17 is the same as that of the third level outer step of inner-barrel 39. The retainer ring 17 also has a V-shaped trough in its inner side.

The cylindrical pad 29 is made of magnetic material;

The steel ball 30 is a ball made of steel.

The first pin 10, second pin 12, third pin 14, fourth pin 31, fifth pin 32, sixth pin 26, seventh pin 28 are all cylindrical pins.

The clamping screw 42 is an outer side threaded ring with its inner diameter larger than optical beam;

The sleeve 41 is a sleeve whose inner diameter is larger than the optical beam.

The optical element is a polaroid 40.

Figure 1:
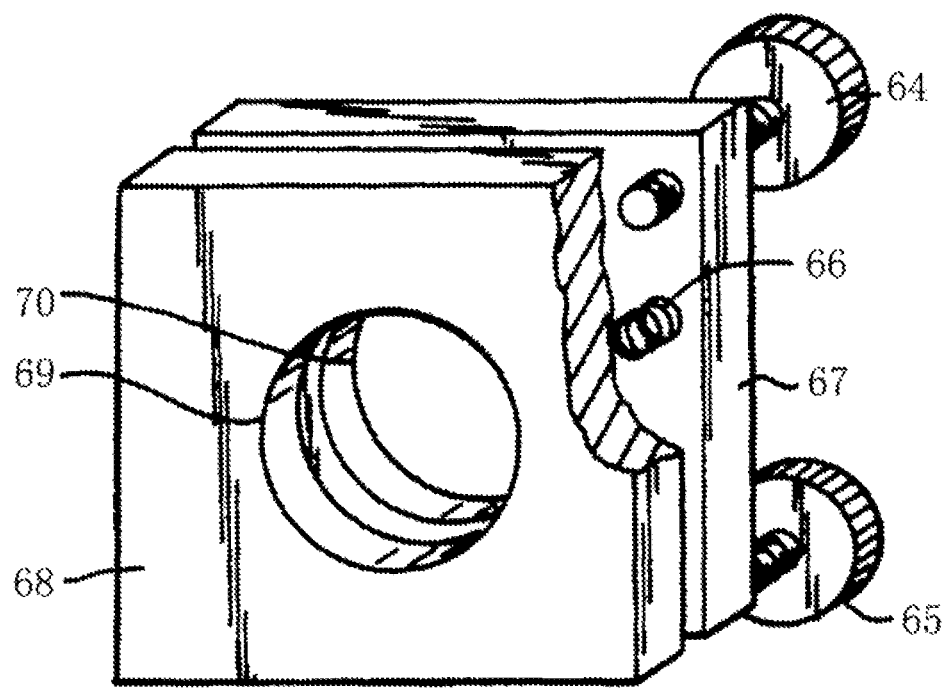
FIGS. 1 and 2 illustrate a prior art optical mounting apparatus having a conventional three-point suspension mechanism.
Figure 2:
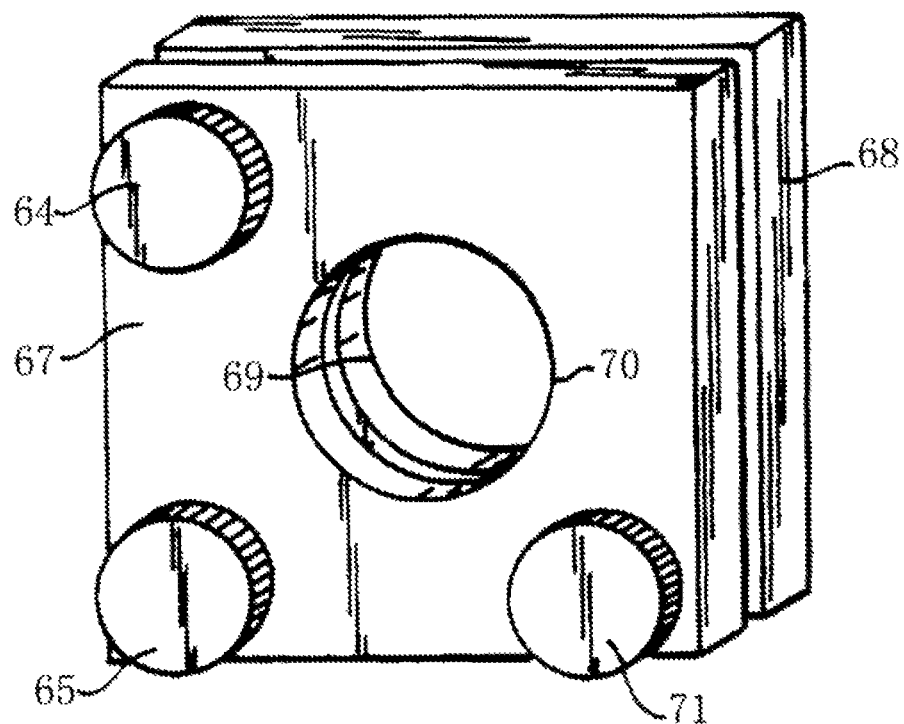
Figure 3:
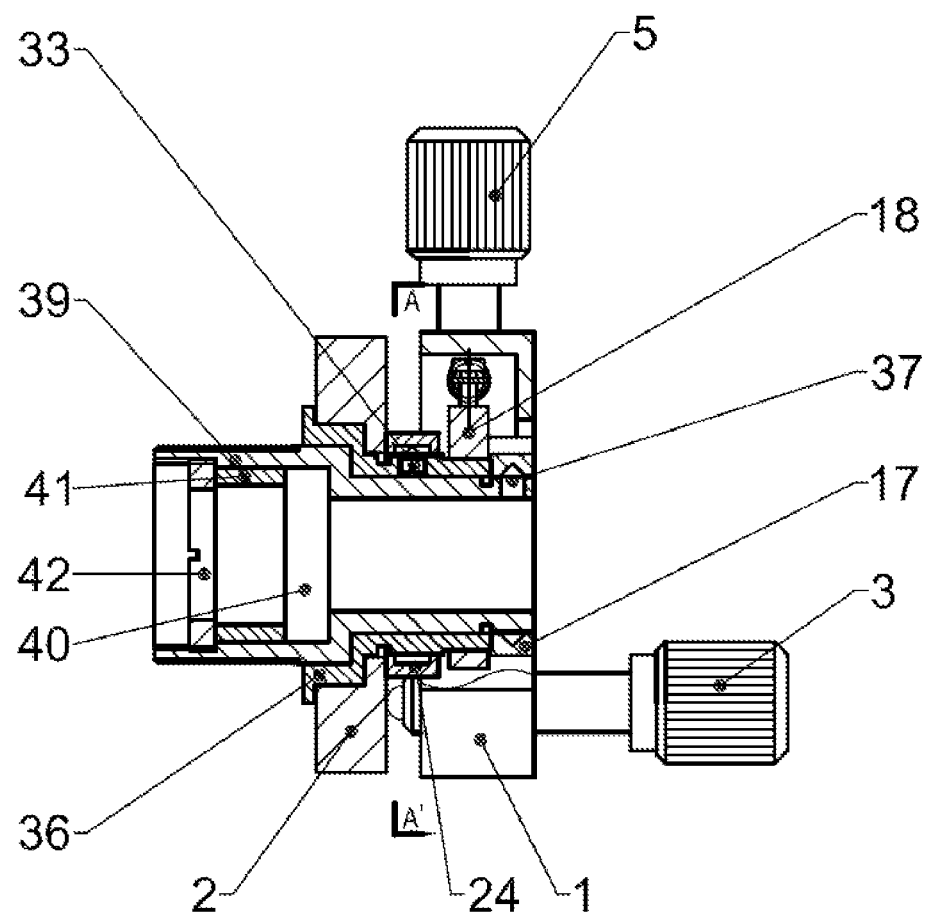
FIG. 3 illustrates a cross section of an exemplary embodiment.

In FIGS. 3-5, the installing procedure and the principle of the invention is described as follows:

First, the first actuator 3, second actuator 4 and third actuator 5 are restrained by the first actuator retaining hole 6, the second actuator retaining hole 7 and the third actuator retaining hole 8, respectively. Then the mid-barrel 36 is plugged into the 2-level step-hole 48 in rectangular front plate 2 and then restrained by fastening clamping ring 24. The second keepers 33 cooperate with the second threaded holes 35 to lock the clamping ring 24, so the axial displacement between mid-barrel 36 and rectangular front plate 2 is restrained. The flange 18 is fixed with mid-barrel 36 by cooperating the four third keepers 21 through first through holes 43 with the four third threaded holes 34, respectively. After that, the inner-barrel 39 inserts through mid-barrel 36 and is locked by cooperating the retainer ring 17 with the third level out step of inner-barrel 39 for preventing the inner turnplate 39 depart from mid-turnplate 36, the retainer ring 17 is then locked by the first keepers 37. The fourth pin 31 and fifth pin 32 are settled in the first pin holder 49 and the second pin holder 50 to form a V-shaped groove to retain the first actuator 3. The cylindrical pad 29 is settled in the second blind hole 45 to retain the second actuator 4. Then, one end of the first restraining spring 23 is captured by the sixth pin 26 held by the fourth pin hole 25 through the first blind spring receiving pocket 55, whereas the other end of the first restraining spring 23 is captured by the first pin 10 held by the first pin hole 9 through the first through spring receiving pocket 52. Similarly, one end of the second restraining spring 22 is captured by the seventh pin 28 held by the fifth pin hole 27 through the second blind spring receiving pocket 54, whereas the other end of the second restraining spring 22 is captured by the second pin 12 held by the second pin hole 11 through the second through spring receiving pocket 53. One end of the third restraining spring 19 is captured by the third pin 14 held by the third pin hole 13 through the third through spring receiving pocket 56, whereas the other end of the third restraining spring 19 is retained by the fourth keeper 20 cooperates with the fourth threaded hole 51. The steel ball is then located between the first conical bore 16 and the second conical bore 46. At last, polaroid 40 is located into inner-barrel 39 which is clamped by the clamping screw 42 after being held by sleeve 41. The installing procedure is finished.

Figure 13:
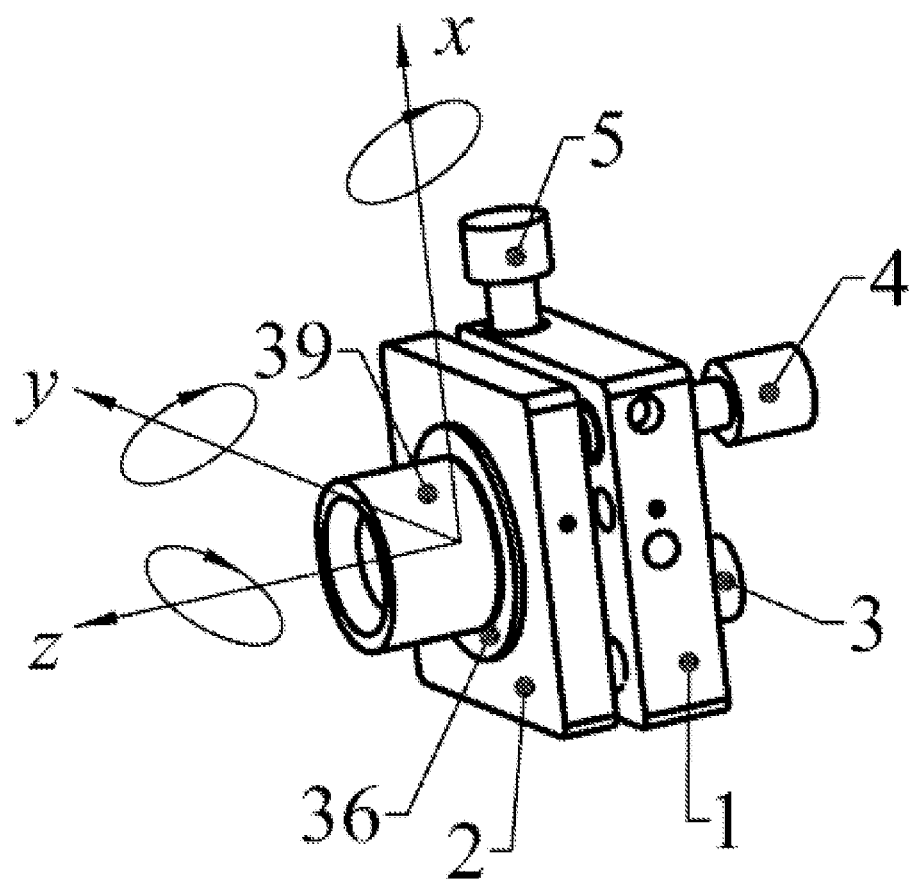
FIG. 13 illustrates a schematic for adjusting an exemplary embodiment.

In FIG. 13, the optical axis is the z axis-. Turn the first actuator 3 and the second actuator 4 to adjust angles of the front plate 2 in x axis and y axis respectively to realize the 2D angular adjustments. By rotating the inner-barrel 39, the polarization angle is directly changed for rough adjustment. By turning the third actuator 5, the flange 18 will rotate. As flange 18 is fixed with mid-barrel 36 and mid-barrel 36 is clamped with inner-barrel 39 to some extent, the inner-barrel 39 will also rotate, so that the fine adjustment in z axis is realized.

Probation indicates that the invention is precise, compact and simple. It is good for 3D angular adjustments of small optics.

Although a specific embodiment of the invention is described and illustrated above, the invention is not to be limited to the specific forms or arrangements of parts so described and illustrated. The invention is limited by the claims that follow.

What is claimed is:

1. A 3D angular adjustable optical mount, comprising:
a rectangular back plate having a center, a head face, side faces, a nether side, a right side, a left side, and corners;
a rectangular front plate;
an inner-barrel;
a mid-barrel;
a flange;
a clamping ring;
a retainer ring having a V-shaped trough;
a cylindrical pad;
a clamping screw;
a sleeve;
a steel ball;
an optical element;
three actuators being a first actuator, a second actuator, and a third actuator;
three restraining spring being a first restraining spring, a second restraining spring, and a third restraining spring;
four sets of keepers being first keepers, second keepers, third keepers, and fourth keepers, and
seven pins being a first pin, a second pin, a third pin, a fourth pin, a fifth pin, a sixth pin, and a seventh pin,
wherein an aperture that is larger than an optical beam in diameter is in the center of the rectangular back plate,
a space is in the head face of rectangular back plate facing the rectangular front plate around the aperture in the center of the rectangular back plate,
a first actuator retaining hole and a second actuator retaining hole are formed in two of the opposite corners of the rectangular back plate, and a first conical bore is located in one of other corners of the rectangular back plate,
a third pin hole is formed near the space in the head face of rectangular back plate, and a third through spring receiving pocket is formed in the side face of the rectangular back plate,
a third actuator retaining hole is formed in the side face of the rectangular back plate opposite the first conical bore, a first through spring receiving pocket is formed between the first actuator retaining hole and the first conical bore, a second through spring receiving pocket is formed between the second actuator retaining hole and the first conical bore, a vertical first pin hole is located in the nether side of the rectangular back plate, a horizontal second pin hole and a set of threaded mounting holes are formed in the right side of the rectangular back plate, the third pin hole and the third through spring receiving pocket are near the second actuator retaining hole, a 2-level step-hole is formed in middle of the rectangular front plate, corresponding to the second actuator retaining hole, the second through spring receiving pocket, the first conical bore, the first through spring receiving pocket, and the first actuator retaining hole in the rectangular back plate, and accordingly, a second blind hole, a second blind spring receiving pocket, a second conical bore, a first blind spring receiving pocket, and a first blind hole are formed in the rectangular front plate, a first pin holder and a second pin holder are located in both sides of the first blind hole, respectively, and a fourth pin hole and a fifth pin hole are in accordance with the first blind spring receiving pocket and the second blind spring receiving pocket.

2. The 3D angular adjustable optical mount according to claim 1, wherein the inner-barrel is a barrel that consists of 3-level steps in both inner and outer sides being a first level inner and outer steps, a second level inner and outer steps, and a third level inner and outer steps; the first level inner step is threaded; the third level inner step is larger than the optical beam in diameter; the third level outer step is threaded; and several first threaded holes are equally distributed in radial direction in the third outer step.

3. The 3D angular adjustable optical mount according to claim 2, wherein equal numbers of first through holes corresponding to numbers of the first threaded holes are equally distributed in radial direction of the flange, a spring bulge and a screw rod bulge are formed among the first through holes, and in the spring bulge, there is a fourth threaded hole in radial direction; and the diameter of the flange is same as the fourth level outer step of the mid-barrel.

4. The 3D angular adjustable optical mount according to claim 2, wherein said retainer ring has the V-shaped trough in its inner side; an inner whorl of said retainer ring corresponds with that of the third level outer step of the inner-barrel.

5. The 3D angular adjustable optical mount according to claim 1, wherein the mid-barrel is a barrel that consists of 2-level steps in inner side that are a first level inner step and a second level inner step and 4-level steps in outer side that are a first level outer step, a second level outer step, a third level outer step, and a fourth level outer step, a second threaded hole is radially formed in the third level outer step which is threaded; and several third threaded holes are equally distributed in radial direction in the fourth level outer step which is threaded; and wherein said first level and second level inner steps of the mid-barrel coordinate with the first level and second level outer steps of the inner-barrel.

6. The 3D angular adjustable optical mount according to claim 5, wherein said clamping ring has a rectangular trough in its inner side; an inner whorl of said clamping ring corresponds with that of the third level outer step of the mid-barrel.

7. The 3D angular adjustable optical mount according to claim 1, wherein said cylindrical pad is made of magnetic material.

8. The 3D angular adjustable optical mount according to claim 1, wherein the first actuator, the second actuator, and the third actuator are standard screw-nut modules.

9. The 3D angular adjustable optical mount according to claim 1, wherein the first pin, the second pin, the third pin, the fourth pin, the fifth pin, the sixth pin, and the seventh pin are all cylindrical pins.

10. The 3D angular adjustable optical mount according to claim 1, wherein the clamping screw is an outer side threaded ring, and its inner diameter is larger than the optical beam.

11. The 3D angular adjustable optical mount according to claim 1, wherein the inner diameter of the sleeve is larger than the optical beam.

12. The 3D angular adjustable optical mount according to claim 1, wherein the space is used for installing the flange, the clamping ring, and the third restraining spring.

13. The 3D angular adjustable optical mount according to claim 1, wherein during installation, the mid-barrel is plugged into a step-hole, and then the clamping ring is cooperated with a whorl of a third level outer step of the mid-barrel, the second keepers cooperate with second threaded holes and contact with a rectangular trough of clamping ring to restrain an axial displacement between the mid-barrel and the rectangular front plate.

14. The 3D angular adjustable optical mount according to claim 1, wherein the flange is fixed with the mid-barrel by cooperating the 4 third keepers through first through holes with the 4 third threaded holes, respectively.

15. The 3D angular adjustable optical mount according to claim 1, wherein the inner-barrel passes through the mid-barrel, a third level outer step of the inner-barrel cooperates with the retainer ring which is further clamped by first keepers contacting with the V-shaped trough of the retainer ring after being fixed by first threaded holes to restrain the axial displacement between the mid-barrel and the inner-barrel.

16. The 3D angular adjustable optical mount according to claim 1, wherein the third actuator is restrained by the third actuator retaining hole, and connects with a screw rod bulge.

17. The 3D angular adjustable optical mount according to claim 1, wherein the fourth pin and the fifth pin are settled in the first pin holder and the second pin holder, respectively, and the cylindrical pad is settled in the second blind hole.

18. The 3D angular adjustable optical mount according to claim 1, wherein one end of the first restraining spring is captured by the sixth pin held by the fourth pin hole through the first blind spring receiving pocket, other end of the first restraining spring is captured by the first pin held by the first pin hole through the first through spring receiving pocket, one end of the second restraining spring is captured by the seventh pin held by the fifth pin hole through the second blind spring receiving pocket, other end of the second restraining spring is captured by the second pin held by the second pin hole through the second through spring receiving pocket, and one end of the third restraining spring is captured by the third pin held by the third pin hole through the third through spring receiving pocket, other end of the third restraining spring is retained by the fourth keeper cooperates with a fourth threaded hole.

19. The 3D angular adjustable optical mount according to claim 1, wherein the first actuator and the second actuator are restrained by the first actuator retaining hole and the second actuator retaining hole in rectangular back plate respectively; and one end of the first actuator is received by a V-shaped groove formed by the fourth pin and fifth pin settled in the first pin holder and second pin holder respectively, one end of the second actuator is received by the cylindrical pad settled in the second blind hole.

20. The 3D angular adjustable optical mount according to claim 1, wherein the optical element is retained in a second level inner step of the inner-barrel which is clamped by the clamping screw after being held by the sleeve.

* * * * *